United States Patent
Koeneman et al.

(10) Patent No.: US 7,032,608 B2
(45) Date of Patent: Apr. 25, 2006

(54) MICROFLUIDIC CHECK-VALVE EMBEDDED IN LCP

(75) Inventors: Paul B. Koeneman, Palm Bay, FL (US); Terry M. Provo, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 58 days.

(21) Appl. No.: 10/932,247

(22) Filed: Sep. 1, 2004

(65) Prior Publication Data

US 2006/0042698 A1   Mar. 2, 2006

(51) Int. Cl.
*F16K 15/04* (2006.01)
*B32B 31/18* (2006.01)

(52) U.S. Cl. .............. 137/15.18; 137/315.33; 137/528; 137/533.11; 156/275.1; 156/308.4; 251/368

(58) Field of Classification Search ......... 137/533.11, 137/15.18, 315.33; 251/368; 156/275.1, 156/308.4
See application file for complete search history.

(56) References Cited

U.S. PATENT DOCUMENTS

| | | | | |
|---|---|---|---|---|
| 4,958,661 A | * | 9/1990 | Holtermann et al. | 137/843 |
| 5,826,349 A | * | 10/1998 | Goss | 26/3 R |
| 5,993,593 A | * | 11/1999 | Swartz et al. | 156/308.4 |
| 6,554,591 B1 | | 4/2003 | Dai et al. | |
| 6,620,273 B1 | | 9/2003 | Dai et al. | |
| 6,834,671 B1 | * | 12/2004 | Cotte et al. | 137/528 |
| 6,874,999 B1 | * | 4/2005 | Dai et al. | 417/413.2 |
| 6,936,130 B1 | * | 8/2005 | Dojan et al. | 156/275.1 |

* cited by examiner

*Primary Examiner*—Ramesh Krishnamurthy
(74) *Attorney, Agent, or Firm*—Sacco & Associates, PA (57) ABSTRACT

Embedded check-valve assembly (100, 600) for integration in a micro-fluidic system. The assembly can include a check-valve chamber (104, 604), an inlet port (106, 606) and an outlet port (108, 608) formed from at least one layer of liquid crystal polymer (LCP) film to form a substrate (102, 602). A plug (114, 614) is disposed within the check-valve chamber.

23 Claims, 5 Drawing Sheets

MICROFLUIDIC CHECK-VALVE EMBEDDED IN LCP

BACKGROUND OF THE INVENTION

Statement of the Technical Field

The inventive arrangements relate generally to microfluidic devices and more particularly to structures and systems for preventing fluid backflow.

DESCRIPTION OF THE RELATED ART

Micro-fluidic systems have the potential to play an increasingly important role in many developing technology areas. For example, there has been an increasing interest in recent years in the use of fluid dielectrics for use in RF systems. Likewise, conductive fluids can have use in RF systems as well.

Another technological field where micro-fluidic systems are likely to play an increasingly important role is fuel cells. Fuel cells generate electricity and heat by electrochemically combining a fuel and an oxidant, via an ion-conducting electrolyte. Some types of fuel cells produce waste water as a byproduct of the reaction. This waste water must be transported away from the reaction to be exhausted from the system by a fluid management sub-system.

Efforts are currently under way to create very small fuel cells, called microcells. It is anticipated that such microcells may eventually be adapted for use in many portable electronics applications. For example, such devices could be used for powering laptop computers and cell phones. Still, microcells present a number of design challenges that will need to be overcome before these devices can be practically implemented. For example, miniaturized electromechanical systems must be developed for controlling the fuel cell reaction, delivering fuel to the reactive components and disposing of water produced in the reaction.

Many of the applications for fuel cells and other types of microfluidic systems can require fluid control systems with an ability to prevent backflow of fluids. For example, check-valves that allow fluid to flow in only one direction are often needed in such systems. Conventional approaches to such check-valves can be implemented as discrete components added to a substrate based system. However, discrete components are typically mounted on the surface of the device and can create a higher profile. They also can tend to be less robust. In this regard, innovations in fuel cell designs are beginning to look to silicon processing and other techniques from the fields of microelectronics and micro-systems engineering. In the semiconductor area, there has been some development of micro electromechanical systems (MEMS) that include check-valves. However, these devices tend to have long development times, are difficult to interface in the macro world, and require more mechanical interfaces.

SUMMARY OF THE INVENTION

The invention concerns a method for embedding a check-valve in a liquid crystal polymer (LCP) based substrate. The method can begin by milling at least one liquid crystal polymer (LCP) film layer to remove at least a portion of the layer. The milled LCP film layer can then be arranged in a stack with at least one other LCP film layer so that the portion of the LCP film layer remaining after it has been milled defines at least part of a check-valve chamber, an inlet port, or an outlet port. Further, a plug can be positioned within the check-valve chamber for sealing an inlet port of the check-valve chamber when fluid is flowing in a direction from the inlet port to the outlet port. Finally, the method can include bonding the stack of LCP film layers together.

According to one aspect, the method can include the step of forming from two or more LCP film layers, the check-valve chamber, an inlet port in fluid communication with the check-valve chamber, or an outlet port in fluid communication with the check-valve chamber. The LCP film layers can be bonded together to form a stack with the plug disposed in the check-valve chamber. The forming of the check-valve chamber, the inlet port and the outlet port can be performed by milling at least one of the LCP film layers prior to forming the stack.

The shape of the check-valve chamber and a position of the inlet port can be selected for automatically sealing the inlet port with the plug in the presence of a fluid backflow from the check-valve chamber toward the inlet port. Further, the shape can be selected so that the plug is automatically unsealed from the inlet port in the presence of a fluid flow from the inlet port toward the check-valve chamber. For example, the foregoing can be accomplished by forming the check-valve chamber so as to have a tapered profile. More particularly, the tapered profile can be arranged to taper inwardly in a direction toward the inlet port.

According to another aspect, the method can include the step of forming the check-valve chamber with a plurality of outlet ports. Further, the method can include the step of selecting the plug to have a spherical shape. A valve seat can be formed on the inlet port to define a sealing surface corresponding to at least a portion of the plug. According to yet another aspect, the method can include the step of forming the inlet port and the outlet port on mutually orthogonal surfaces of the check-valve chamber. According to yet another aspect of the invention, the inlet port and the outlet port can be disposed on mutually orthogonal surfaces of the check-valve chamber.

The check-valve chamber can be formed without any structure for restricting the range of movement of the plug within the check-valve chamber. Alternatively, the method can include the step of restricting a range of movement of the plug within the check-valve chamber so as to prevent sealing of at least one the outlet port. For example, this can be accomplished by forming from at least one of LCP layers a guide for guiding the plug within the check-valve chamber. The guide can further restrain a range of movement of the plug within the chamber.

Alternatively, the invention can include a check-valve integrated within a substrate. The substrate can be formed from two or more liquid crystal polymer (LCP) film layers arranged in a stack. One or more of the layers can have perforations formed therein to at least partially define a check-valve chamber. The check valve chamber can include an inlet port and an outlet port in fluid communication with the check-valve chamber.

A plug is advantageously disposed within the check-valve chamber. According to one aspect, the plug can have a spherical shape. Further, a valve seat can be included on or at the inlet port. The valve seat can provide a sealing surface corresponding to at least a portion of the shape of the plug.

According to another aspect, the check-valve chamber can have a profile that tapers inwardly in a direction toward the inlet port. Further, more than one outlet port can be provided so that fluid flow in a forward direction will not be impeded, even if one of the outlet ports is blocked. For example, if one of the outlet ports is blocked by the plug, fluid can still flow out of the check-valve chamber through the other of the outlet ports.

The check-valve chamber can be arranged to allow for an unrestricted range of movement of the plug within the check-valve chamber. Alternatively, at least one guide surface can be provided in the check-valve chamber that is at least partially formed from one or more of the LCP film layers. The guide surface can be used for constraining the movement of the plug within the check-valve chamber.

DETAILED DESCRIPTION OF THE PREFERRED EMBODIMENTS

Figure 1:
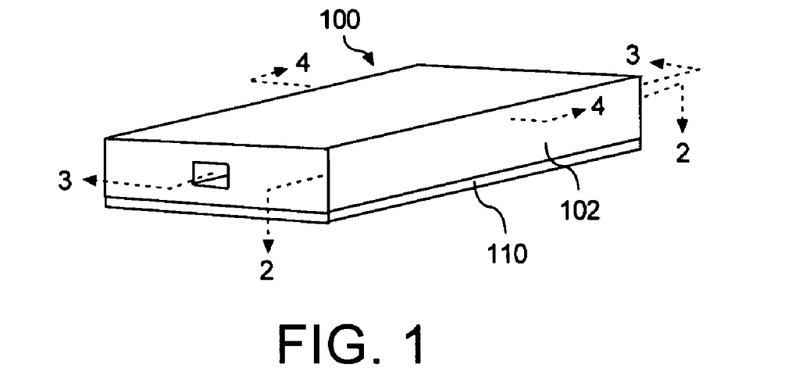
FIG. 1 is a perspective view of a micro-fluidic check-valve that is useful for understanding the present invention.

FIG. 1 shows a first embodiment of a check-valve assembly 100 that is implemented in a substrate 102. The check-valve assembly 100 can be a stand alone device or can be advantageously integrated with a larger system on the substrate. Examples of such larger systems can include fuel cells, micro-motors, and other MEMS type devices. Other examples can include fluid dielectric based devices in the RF field such as antenna elements, matching sections, delay lines, beam steering elements, tunable transmission lines, stubs and filters, variable attenuators, and cavity structures. Still, the invention is not limited to any particular type of device.

The substrate 102 can be formed from one or more layers of a liquid crystalline polymer (LCP) material. Liquid crystal polymers offer a number of advantages when applied to MEMS structures and microelectronic substrates. For example the material offers excellent moldability in thin sections, a high degree of heat resistance, and is resistant to attack by virtually all chemicals, radiation and burning.

LCP based systems can also involve a considerably shorter development time as compared to semiconductor based systems.

Commercially available LCP materials are commonly offered in thin sheets or films that can be stacked in multiple layers to create completed substrates. For example, an LCP substrate that could potentially be used for one or more layers of the substrate is R/flex® 3000 Series LCP Circuit Material available from Rogers Corporation of Rogers, Conn. The R/flex® 3000 LCP has a low loss tangent and low moisture absorption, and maintains stable electrical, mechanical and dimensional properties. The R/flex® 3000 LCP is available in a standard thickness of 50 μm, but can be provided in other thicknesses as well. Still, the invention is not limited in this regard and any of a wide variety of LCP materials can be used for this purpose.

In some instances it can also be desirable to include a conductive ground plane 110 on at least one side of the substrate 102. For example, the ground plane 110 can be used in those instances where RF circuitry is formed on the surface of the substrate 102. The conductive ground plane 110 can also be used for shielding components from exposure to RF and for a wide variety of other purposes. The conductive metal ground plane can be formed of a conductive metal that is compatible with the substrate 102. The R/flex® 3000 LCP material is available with a conductive metal ground plane predisposed on the LCP layer. Still, those skilled in the art will appreciate that the ground plane is not required for the purposes of the invention. Further, as will become more apparent from the following description, the ground plane is advantageously omitted in some of the film layers.

Figure 2:
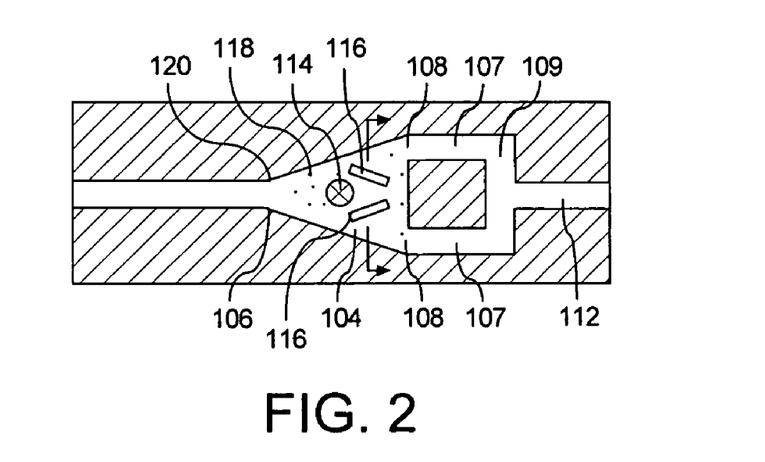
FIG. 2 is a cross-sectional view of the check-valve in FIG. 1, taken along line 2—2.
Figure 3:
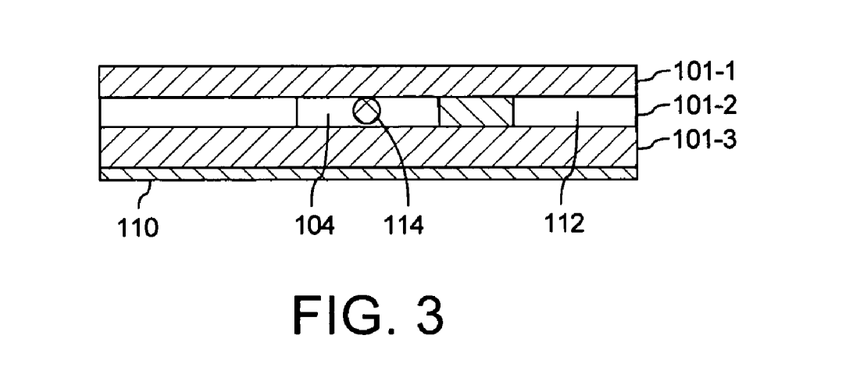
FIG. 3 is a cross-sectional view of the check-valve in FIG. 1, taken along line 3—3.

The check-valve assembly 100 is shown in cross-sectional view in FIGS. 2 and 3. As illustrated therein, a check-valve chamber 104 is formed from a plurality of layers 101-1, 101-2, 101-3 of LCP film. In FIG. 3, only three layers of LCP film are shown. However, it should be understood that the invention is not limited in this regard and any number of LCP film layers can be used. Further, it may be noted that only a lowermost film layer 101-3 includes a conductive ground plane in FIG. 3. However, those skilled in the art will readily appreciate that the invention is not limited in this regard. Instead, more or fewer LCP film layers can be provided with a conductive ground plane layer.

The check-valve chamber can have an inlet port 106 in fluid communication with the check-valve chamber 104 as shown. The inlet port 106 can also include a valve seat 120. The valve seat can define a contour or surface corresponding to at least a portion of the shape of a plug 114 for forming a good seal with the plug.

At least one outlet port 108 is also provided in fluid communication with the check-valve chamber 104. If more than one outlet port 108 is provided, a manifold 109 can provide multiple fluid paths 107 that advantageously allow both outlet ports 108 to feed a common output conduit 112. Consequently, if one outlet port 108 is blocked for any reason, fluid can continue flowing toward the outlet conduit 112 through the other outlet port.

Plug 114 can be positioned within the check-valve chamber 104 during the lay up process of the LCP film layers 101-1, 101-2, 101-3. The plug 114 is preferably formed so that it will be at least somewhat larger than the size of the opening defining the inlet port 106. The plug 114 can advantageously be formed so as to have any shape that will allow the plug to form a close fitting seal when it is urged against the inlet port 106. For example, a spherical shape can be used for this purpose. The spherical shape will allow the plug, when it is urged toward the inlet port 106, to block the inlet port 106 regardless of the orientation of the plug. A spherically shaped plug 114 can be advantageous as it will form a proper seal regardless of plug orientation. Still, the plug can have other shapes and still form a suitable seal.

The plug 114 can be formed of any suitable material that is compatible with the LCP film layers 101-1, 101-2, 101-3, and any fluid that is intended to be used in the device. For example, the plug 114 can be formed of a metal, glass or polymer. In some instances, it may be desirable to form the plug from LCP. In other instances, it may be desirable to form the plug from a ceramic material or a low temperature co-fired ceramic (LTCC). In that case, the plug can be fired and formed to the necessary shape before it is placed within the check-valve chamber 104.

Figure 4:
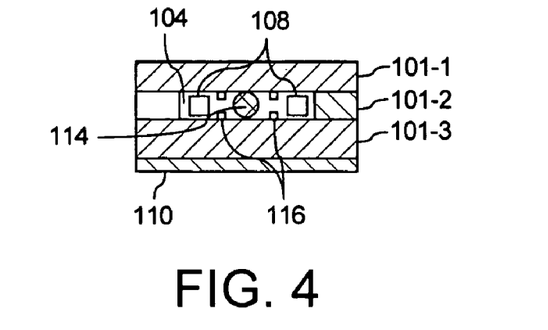
FIG. 4 is a cross-sectional view of the check-valve in FIG. 1, taken along line 4—4.

Referring now to FIGS. 2 and 4, a guide structure 116 can optionally be provided within the check-valve chamber to constrain the motion of the plug 114. The guide structure 116 can perform several functions. For example, in those instances where a non-spherical shaped plug is used, the guide structure 116 can maintain the plug 114 in a desired orientation for forming a seal with the inlet port 106. The guide structure can also be used to limit a range of motion for the plug 114 so as to ensure that the plug cannot seal any of the outlet ports 108 when fluid is flowing in a forward direction, i.e. from the inlet port toward to outlet port. If the guide structure is used, the need for more than one outlet port can be avoided if there is no possibility that the outlet port will be blocked by the plug when fluid is flowing in the forward direction.

Referring again to FIGS. 1–5, the check-valve chamber 104 can have a tapered profile so that it tapers inwardly in a direction of the inlet port 108. The tapered profile is useful for ensuring that the plug 114 will be directed toward the inlet port 106 in the event of a fluid backflow proceeding from the outlet ports 108 toward the inlet port 106. Still, those skilled in the art will appreciate that the check-valve chamber can have other shapes as well. In any case, once the plug 114 and the layers of LCP film 101-1, 101-2, 101-3 forming the check-valve chamber are assembled as shown, they are ready to be laminated together to form a completed check-valve assembly.

Figure 5A:
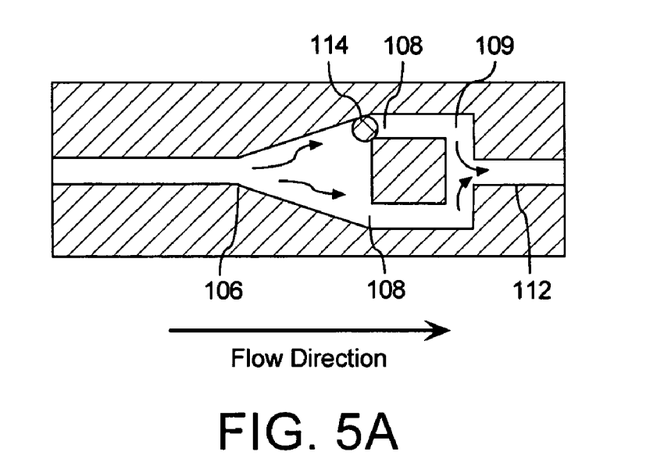
FIG. 5A is a cross-sectional view of the check-valve in FIG. 1, taken along line 2—2, in the presence of a fluid flow in a first direction.
Figure 5B:
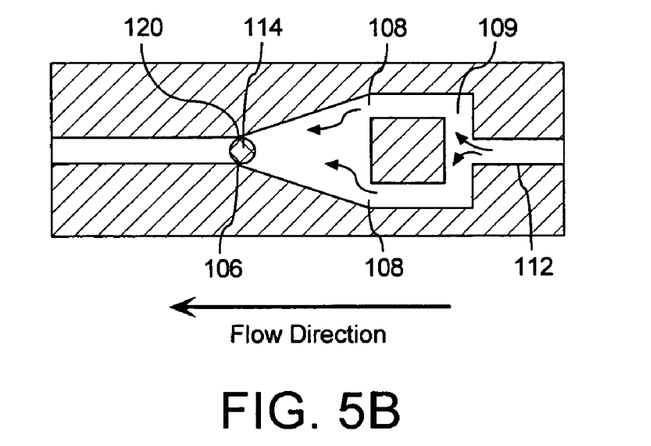
FIG. 5B is a cross-sectional view of the check-valve in FIG. 1, taken along line 2—2, in the presence of a fluid flow in a second back-flow direction.

Referring now to FIGS. 5A and 5B, it may be observed that fluid flow in a forward direction can cause the plug 114 to disengage from the valve seat 120. If a guide structure 116 is provided as shown in FIG. 2, the plug can be urged into the guide structure so as to remain clear of the outlet ports 108. Alternatively, if no guide structure 116 is provided, the plug 114 can move about freely in the chamber as shown in FIGS. 5A and 5B, and may lodge in one of the outlet ports. Still, fluid will be able to flow freely in the forward direction since two outlet ports 114 are provided and the manifold 109 will direct a flow from either outlet port 108 to the outlet conduit 112.

The check-valve can prevent a fluid backflow as shown in FIG. 5B. In the event that conditions in a fluid system in which the check-valve is installed cause a fluid flow in the direction shown in FIG. 5B, the plug 114 will be urged toward the inlet port and will ultimately become lodged in the valve seat 120. Thereafter, backflow of fluid will be prevented and the plug 114 will not become unseated until a fluid flow in the direction shown in FIG. 5A is resumed.

Figure 6:
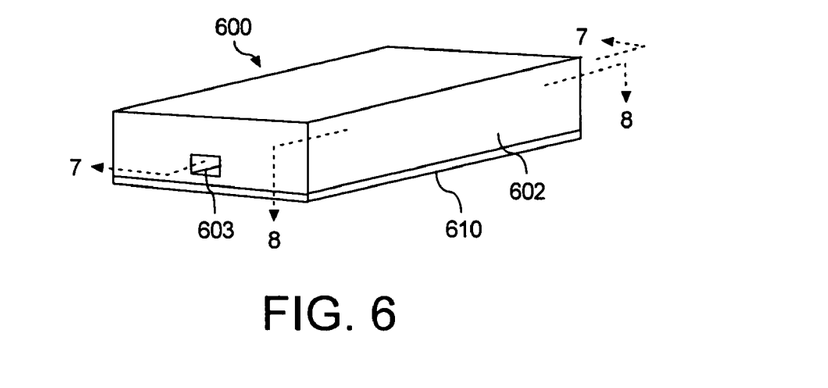
FIG. 6 is a perspective view of an alternative embodiment micro-fluidic check-valve that is useful for understanding the present invention.
Figure 7A:
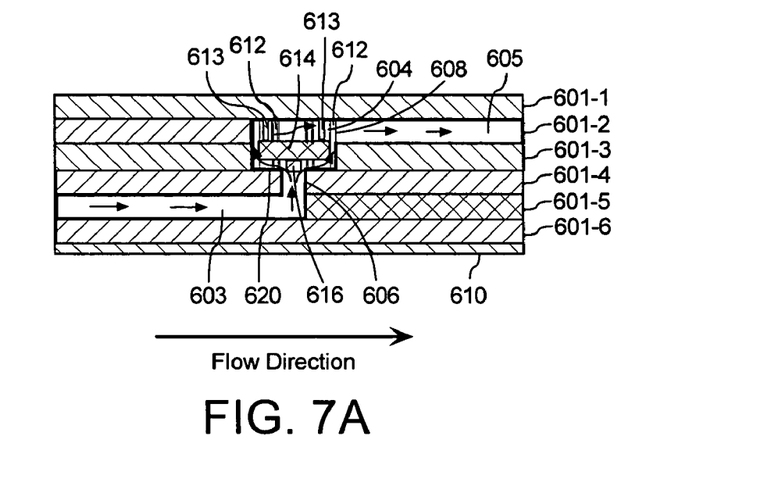
FIGS. 7A–7B are a series of drawings that are useful for understanding the operation of the micro-fluidic check-valve in FIG. 6.
Figure 7B:
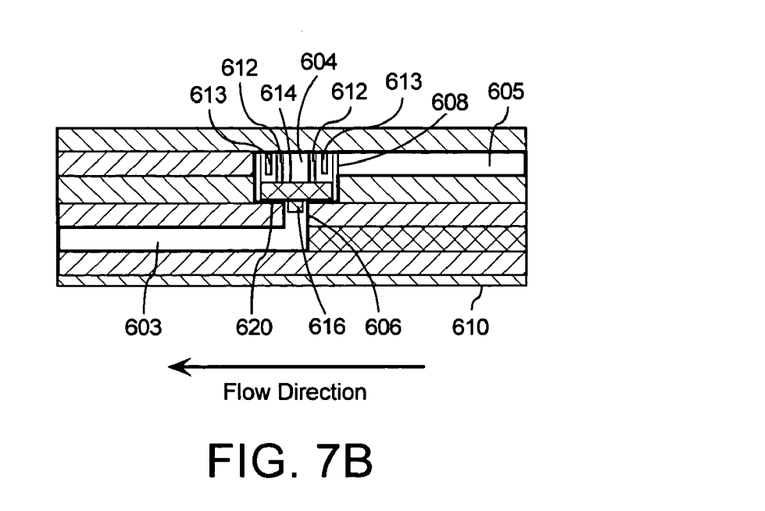
Figure 8:
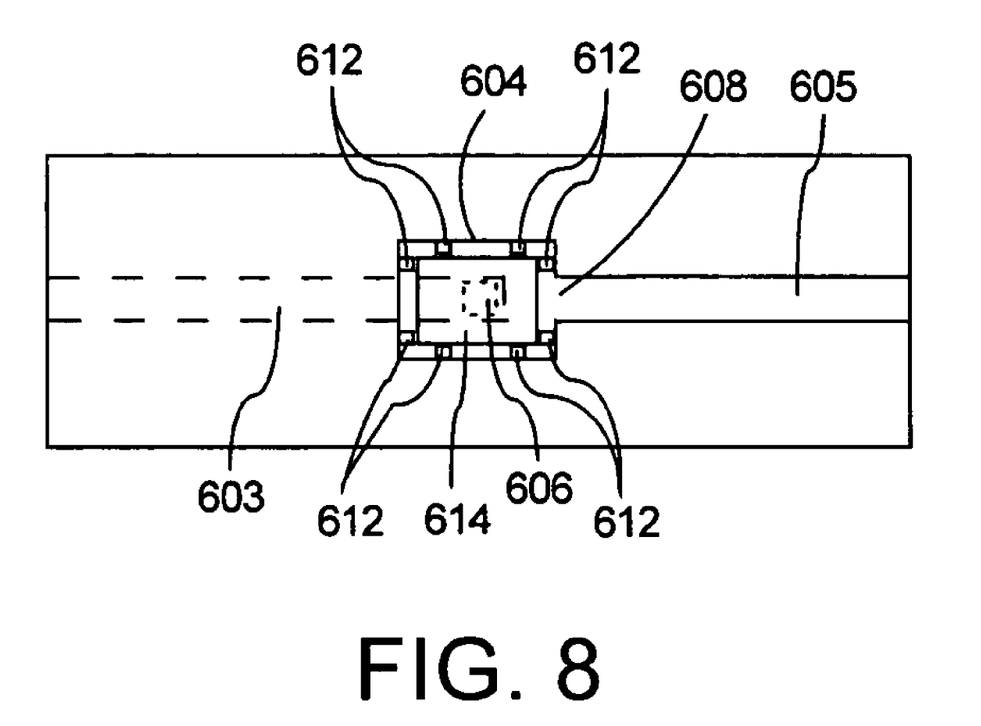
FIG. 8 is a cross-sectional view of the micro-fluidic check-valve in FIG. 6, taken along line 8—8.

FIGS. 6–8 show an alternative arrangement of a check-valve assembly 600 integrated in an LCP substrate 602. As with the embodiment in FIGS. 1–5, the check-valve assembly 600 can be comprised of a plurality of LCP film layers 601-1, 601-2, 601-3, 601-4, 601-5, 601-6 and an optional conductive ground plane layer 610. As with the previous embodiment, more or fewer LCP layers can be used and the invention is not limited to any particular number of layers.

The LCP layers 601-1, 601-2, 601-3, 601-4, 601-5, 601-6 can define a check-valve chamber 604 that has at least one inlet port 606 and at least one outlet port 608. Input and output fluid conduits 603, 605 can be provided for fluid communication with the input and output ports respectively. The inlet port 606 can also include a valve seat 620. The valve seat can define a contour or surface corresponding to at least a portion of the shape of the plug 614 for forming a good seal with the plug 614.

A plug 614 can be positioned within the check-valve chamber 604 during the lay up process of the LCP film. The plug 614 is preferably formed so that it will be at least somewhat larger than the size of the opening defining the inlet port 606 after the LCP film layers forming the chamber have been. The plug 614 can advantageously be formed so as to have any shape that will allow the plug to form a close fitting seal when it is urged against the inlet port 606. For example, a spherical or a parallelepiped shape can be used for this purpose. The spherical shape will allow the plug 614, when it is urged toward the inlet port 606, to block the inlet port 606 regardless of the orientation of the plug. The parallelepiped shape, if used to form the plug, can have a nub 616. The nub 616 can help center the plug in the inlet port and provide a better seal. Still, those skilled in the art will readily appreciate that the plug 616 can have other shapes and still form a suitable seal.

Referring now to FIGS. 7 and 8, a guide structure 612 can optionally be provided within the check-valve chamber 604 to constrain the motion of the plug 614. The guide structure 612 can perform several functions. For example, in those instances where a non-spherical shaped plug is used, the guide structure 612 can maintain the plug 614 in a desired orientation for forming a seal with the inlet port 606. The guide structure can also be used to limit a range of motion for the plug 614 so as to ensure that the plug cannot seal the outlet port 608 when fluid is flowing in a forward direction, i.e. from the inlet port toward to outlet port.

In FIGS. 7A–7B and FIG. 8, the guide structure 612 is formed as a series of ridges defined along the inner surface of the check-valve chamber 604. The ridges hold the plug in position while ensuring that flow of fluid can occur between the walls of the check-valve chamber and the outer periphery of the plug. Still, those skilled in the art will readily appreciate that the invention is not limited in this regard. Instead, any suitable structure can be defined within the check-valve chamber to limit the range of motion of the plug 614, provided that suitable accommodation is made to permit fluid flow in a forward flow direction shown in FIG. 7A.

Further, in order to facilitate operation of the check-valve in an inverted orientation, it can be advantageous to include spacers 613 disposed between the plug 614 and layer 601-1. As illustrated in FIGS. 7A and 7B, the spacers 613 can be formed as part of layer 601-1, 601-2, or as part of the plug 614. The spacers can allow for fluid pressure to form above the plug when backpressure is applied.

The plug 614 can be formed of any suitable material that is compatible with the LCP film layers 601-1, 601-2, 601-3, 601-4, and any fluid that is intended to be used in the device. For example, the plug can be formed of a metal, glass or polymer. In some instances, it may be desirable to form the plug from LCP. In other instances, it may be desirable to form the plug from a ceramic material or a low temperature co-fired ceramic (LTCC). In that case, the plug can be fired and formed to the necessary shape before it is placed within the check-valve chamber 604. In any case, once the plug 614 and the layers of LCP film layers forming the check-valve chamber are assembled as shown, they are ready to be laminated together to form a completed check-valve assembly.

Referring now to FIGS. 7A and 7C, it may be observed that fluid flow in a forward direction can cause the plug 614 to disengage from the valve seat 620. The guide structure 612 will ensure that the plug 614 can be guided so as to remain clear of the outlet port 608 as shown in FIG. 7A. Still, fluid will be able to flow freely in the forward direction since the ridges formed by the guide structure define fluid channels around the outer periphery of the plug 614.

The check-valve 600 can prevent a fluid backflow as shown in FIG. 7B. In the event that conditions in a fluid system in which the check-valve is installed cause a fluid flow in the direction shown in FIG. 7B, the plug 614 will be urged toward the inlet port 606 and will ultimately become lodged in the valve seat 620. Thereafter, backflow of fluid will be prevented and the plug 614 will not become unseated until a fluid flow in the direction shown in FIG. 7A is resumed. Notably, if the check-valve arrangement in FIGS. 7A–7C and FIG. 8 is oriented as shown, gravitational force will urge the plug 614 toward the inlet port 606 provided that fluid is not flowing in the direction shown in FIG. 7A. Accordingly, the check-valve will remain in a normally closed position when fluid is not flowing in a forward direction. This can be an advantage in certain applications.

Figure 9:
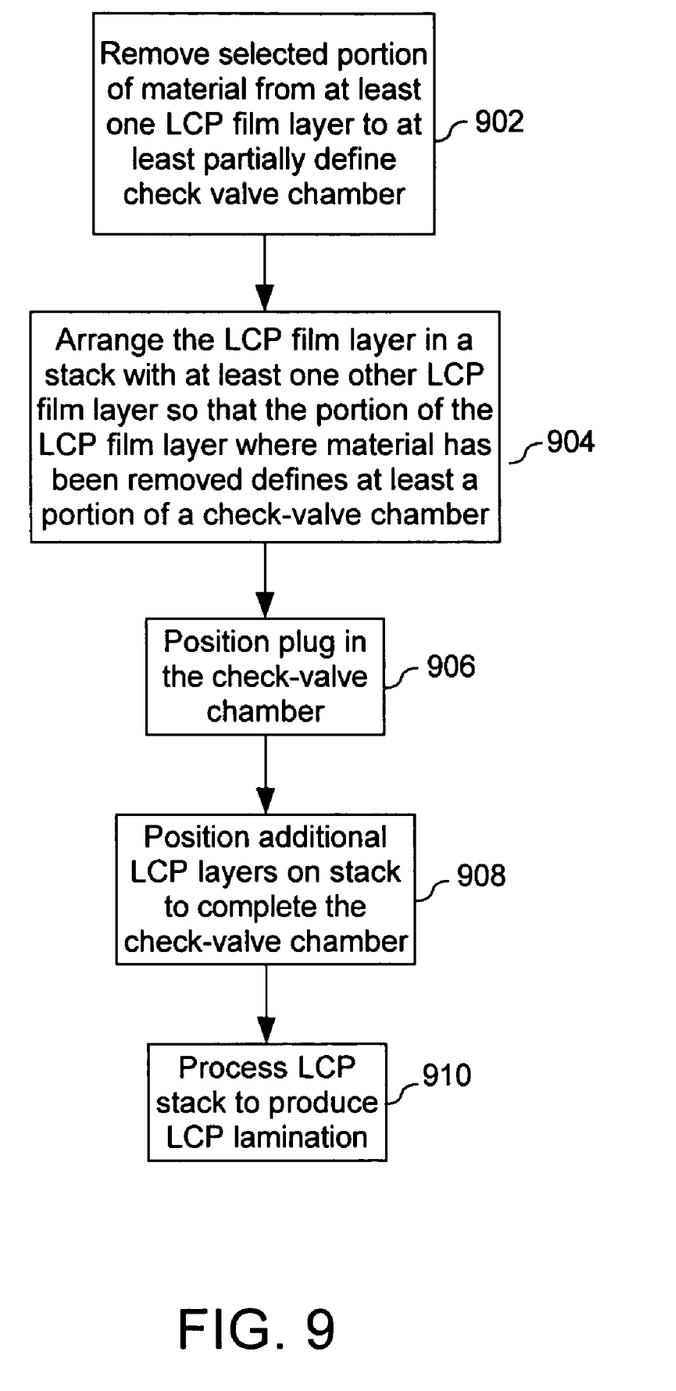
FIG. 9 is a flow chart that is useful for understanding a process for embedding a check valve in a micro-fluidic system.

Referring now to FIG. 9, a process for manufacturing a check-valve assembly as described herein shall now be described in greater detail. The process can begin in step 902 by removing a selected portion of LCP material from at least one LCP film layer. The selected portion of the LCP film layer can be milled in any suitable manner to remove the selected portion of the LCP material. As used herein, the term milled means cutting, drilling, punching, etching, grinding or otherwise removing by any means any portion of the material forming the LCP layer. Further, such milling can include the removal of all or part of the LCP film thickness within a particular area of the LCP film. Removing all the material can form a perforation in the LCP film whereas removing part of the material can define a channel or void that does not penetrate fully through a film layer.

One or more film layers 101-1, 101-2, 101-3 and 601-1, 601-2, 601-3, 601-4, 601-5, 601-6 can be milled as described herein to define a portion of each conduit, inlet port, outlet port or check valve chamber. Since LCP is very resistant to chemical milling or etching with materials other than potassium hydroxide (KOH), other processes can be advantageously used to perform the milling step. According to one embodiment, milling of one or more LCP layers can be performed using laser micromachining techniques. For example, excimer, $CO_2$ and YAG type lasers can be used for this purpose. The laser can be a Q-switched laser or mode-locked laser, although the mode-locked laser is presently preferred due to high quality cut, narrow kerf, and its fast cutting speed in LCP. Still, the invention is not limited in this regard and any other suitable laser can be used to punch and mill the LCP film layers.

Mechanical drilling and cutting methods can also be used to form each LCP layer as described herein. However, since the LCP material is thermoplastic, those skilled in the art will appreciate that machining parameters should be selected to avoid over-heating the sidewall surface.

Once one or more LCP film layers have been milled as described, the individual layers can be combined with other LCP layers in step 904 so as to form a stack. The stack can be comprised of a plurality of film layers of LCP material, so as to at least partially define a check valve chamber 104, 604 as described herein. For example, the stack can be comprised of a plurality of layers as described in relation to FIGS. 1–5 or 6–8. The exact shape, size and location of the check-valve chamber is not limited to a structure of any particular size, shape or location, provided that a plug positioned therein will block a flow of fluid in a backflow direction as previously described.

For example, in FIGS. 1–5, LCP film layers 101-1 and 101-3 can be assembled to form the inlet port 106, outlet port 108, and check valve chamber 104. Similarly, in FIGS. 6–8, LCP film layers 601-3, 601-4, 601-5, and 601-6 can be assembled to partially form the inlet port 606, outlet port 608, and check valve chamber 604.

Once the chamber 104, 604 is at least partially defined, the plug 114, 614 can be disposed in the check-valve chamber in step 906. Subsequently, in step 908, one or more additional LCP layers can be added to the stack as necessary to complete and enclose the check-valve chamber and ports.

One advantage of the foregoing process is that it allows the check-valve assembly to be integrally formed with the remainder of the fluidic system during the lamination or layer bonding process. The resulting system is compact, economical to manufacture, and offers the potential for good reliability.

Lamination of the LCP stack can be performed in step 910 using conventional techniques. Multiple layers of LCP can be bonded together using commercially available adhesive bonding films. For example, several such bonding film products are offered by Rogers Corporation of Chandler, Ariz. In order to maintain an open cavity, some method of selective lamination must be employed. For example, a laser welding system or selectively heated press can be used for this purpose. Alternatively, a sacrificial filler may be disposed in the check valve chamber, channel or ports. The sacrificial fill can be dissolved after the layers forming the LCP stack have been laminated. After the LCP stack has been assembled, the laminated films can be subjected to a press cycle with good temperature control.

For example, if R/flex® 3000 circuit materials are used, the assembled LCP stack can be pressed in a hot oil vacuum press for 20 minutes at 150° C. The temperature can them be ramped up at a rate of 5° C. per minute until the temperature reaches 290° C., at which point the stack can be allowed to soak for 30 minutes. Thereafter, the temperature can be ramped down at a rate of 5° C. per minute until the temperature reaches 150° C. or less. Pressure during the process can be maintained at approximately 100 psi during initial part of the heating cycle and can be increased to 200 psi when the temperature reaches 250° C. during the cool down process. When the temperature is less than 150° C., the stack can be removed from the press.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

We claim:

1. A method for embedding a check-valve in a liquid crystal polymer (LCP) based micro-fluidic system, comprising the steps of:

forming a stack comprised of a plurality of LCP film layers, said stack defining a check-valve chamber, an inlet port in fluid communication with said check-valve chamber, and at least one outlet port in fluid communication with said check-valve chamber;

positioning a plug within said check-valve chamber; and bonding said plurality of LCP film layers together to form a stack with said plug disposed in said check-valve chamber.

2. The method according to claim 1, further comprising the step of forming at least one of said check-valve chamber, said inlet port and said outlet port by milling at least one of said LCP film layers prior to forming said stack.

3. The method according to claim 1, further comprising the step of selecting a shape of said check-valve chamber and a position of said inlet port for automatically sealing said inlet port with said plug in the presence of a fluid backflow from said check-valve chamber toward said inlet port.

4. The method according to claim 2, further comprising the step of selecting said shape of said check-valve chamber for automatically unsealing said plug from said inlet port in the presence of a fluid flow from said inlet port toward said check-valve chamber.

5. The method according to claim 1, further comprising the step of forming said check-valve chamber to have a tapered profile.

6. The method according to claim 4, further comprising the step of forming said tapered profile to taper inwardly in a direction toward said inlet port.

7. The method according to claim 1, further comprising the step of forming said check-valve chamber with a plurality of said outlet ports.

8. The method according to claim 1, further comprising the step of selecting said plug to have a spherical shape.

9. The method according to claim 1, further comprising the step of forming a valve seat for said inlet port, said valve seat defining a sealing surface corresponding to at least a portion of said plug.

10. The method according to claim 1, further comprising the step of forming said check-valve chamber exclusive of any structure to restrict the movement of the plug within the check-valve chamber.

11. The method according to claim 1, further comprising the step of constraining a range of movement of said plug to prevent sealing of at least one said outlet port.

12. The method according to claim 11, wherein said constraining step is further comprised of forming with at least one of said layers a guide for guiding said plug within said check-valve chamber.

13. The method according to claim 1, further comprising the step of forming said inlet port and said outlet port on mutually orthogonal surfaces of said check-valve chamber.

14. A check-valve integrated within a substrate, comprising:

a plurality of liquid crystal polymer (LCP) film layers arranged in a stack, at least one of said layers having one or more perforations formed therein to at least partially define a check-valve chamber; and a plug positioned within said check-valve chamber;

wherein said check valve chamber has an inlet port in fluid communication with said check-valve chamber and an outlet port in fluid communication with said check-valve chamber.

15. The check-valve according to claim 14, wherein said check-valve chamber has a tapered profile.

16. The check-valve according to claim 15, wherein said tapered profile tapers inwardly in a direction toward said inlet port.

17. The check-valve according to claim 14, wherein said check-valve chamber comprises a plurality of said outlet ports.

18. The check-valve according to claim 14, wherein said plug has a spherical shape.

19. The check-valve according to claim 18, further comprising a valve seat formed on said inlet port, said valve seat defining a sealing surface corresponding to at least a portion of said shape of said sphere.

20. The check-valve according to claim 14, wherein said check-valve chamber provides an unrestricted range of movement for said plug within the check-valve chamber.

21. The check-valve according to claim 14, wherein said check-valve chamber further comprises at least one guide surface at least partially formed from at least one of said LCP film layers for constraining the movement of said plug within said check-valve chamber.

22. The check-valve according to claim 14 wherein said inlet port and said outlet port are disposed on mutually orthogonal surfaces of said check-valve chamber.

23. A method for embedding a check-valve in a liquid crystal polymer (LCP) based micro-fluidic system, comprising the steps of:

milling at least one liquid crystal polymer (LCP) film layer to remove at least a portion of said layer;

arranging said LCP film layer in a stack with at least one other LCP film layer, said portion of said LCP film layer that has been milled defining at least a portion of a check-valve chamber;

positioning a plug within said check-valve chamber; and bonding said stack of LCP film layers together.

* * * * *